United States Patent [19]

Renegar

[11] 4,090,828
[45] May 23, 1978

[54] DIE FOR CONDITIONING AN EXTRUDATE

[75] Inventor: Charles Gwin Renegar, Shelbyville, Tenn.

[73] Assignee: Hasbro Industries, Inc., Pawtucket, R.I.

[21] Appl. No.: 650,963

[22] Filed: Jan. 21, 1976

[51] Int. Cl.² .................................................. B29C 25/00
[52] U.S. Cl. ................................. 425/71; 425/192 R; 425/325; 425/392; 425/446
[58] Field of Search ............. 425/325, 461, 465, 466, 425/71, 385, 445, 188, 190, 191, 192, 392, 394, 376, 446, 455; 264/176, 178 R, 348; 72/253, 256

[56] References Cited

U.S. PATENT DOCUMENTS

| 3,674,388 | 7/1972 | Heilmayer et al. | 425/385 X |
| 3,851,028 | 11/1974 | Beyer | 425/71 X |

FOREIGN PATENT DOCUMENTS

| 1,911,223 | 9/1970 | Germany | 425/71 |
| 2,121,270 | 11/1972 | Germany | 425/461 |

Primary Examiner—Francis S. Husar
Assistant Examiner—Mark Rosenbaum
Attorney, Agent, or Firm—Shapiro and Shapiro

[57] ABSTRACT

A die for cooling, sizing and smoothing an extrudate includes a mounting plate having an orifice for receiving the extrudate, and a plurality of die members each having an aperture. The die members are mounted on the mounting plate in cascade relationship so that the members are axially spaced and the apertures are in alignment with the orifice in the mounting plate. The die members may be unitary flat metallic discs each having an aperture, or the die members may be a composite of a pair of overlying metallic discs each disc of the pair having an elongated slot extending inwardly from a peripheral edge, with the discs oriented so that the closed end of each slot defines a portion of the aperture.

15 Claims, 10 Drawing Figures

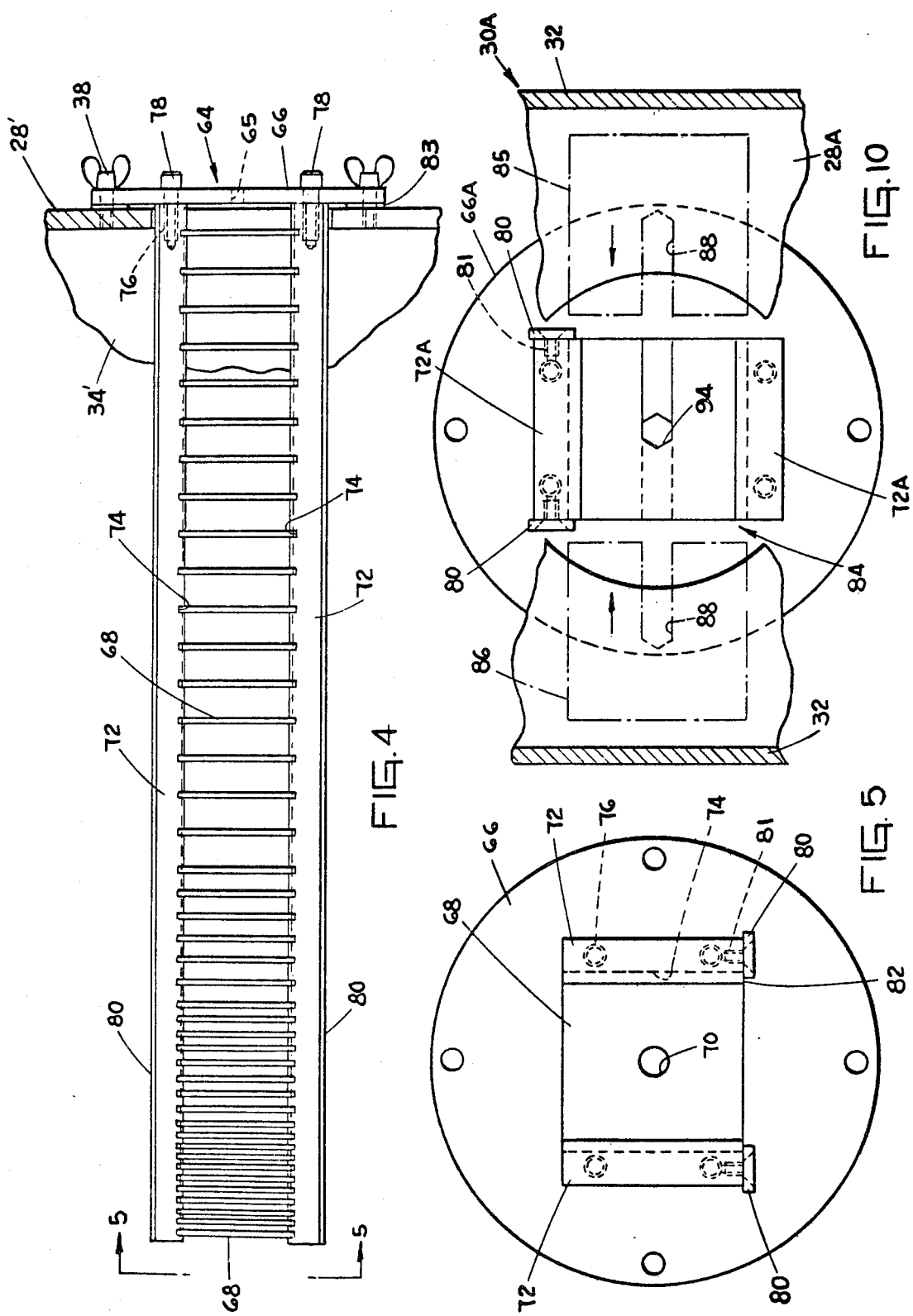

DIE FOR CONDITIONING AN EXTRUDATE

BACKGROUND OF THE INVENTION

This invention relates to a die for treating or conditioning an extrudate, and more particularly to a cascade die for sizing, cooling and smoothing an extrudate to provide pencils.

It is known to manufacture pencils continuously by extruding a sheathing composition over a marking core. The coextrusion leaves the extrusion head in a semi-plastic state. Before the extrudate can be coated with a lacquer or paint and cut into the desired lengths to form individual pencils, it has been found desirable to treat or condition the extrudate by cooling it to make it substantially rigid, to size it to obtain a uniform cross-section, and to smooth it to obtain a surface suitable for coating or painting.

BRIEF DESCRIPTION OF THE INVENTION

According to the present invention, a cascade die is provided for conditioning an extrudate, the die including a mounting plate having an orifice for receiving the extrudate as it leaves the extruder head, a plurality of die members each having an aperture through which the extrudate passes, and means mounting the die members on the mounting plate in cascade (i.e., serial) relationship so that the members are axially spaced with their apertures in alignment with the orifice in the mounting plate.

The die members may be unitary flat metallic discs, each having an aperture or hole, and the discs may be uniformly or non-uniformly spaced from each other. Each die member acts as a heat sink removing heat from the extrudate as it passes through the aperture in the member. The amount of heat extracted from the extrudate is directly related to the number of members that are cascaded downstream of the mounting plate. If the extrudate is running undersize, and with discs of a given material, thickness and surface area, the number of discs must be reduced to reduce the cooling effect. Conversely, if the extrudate is running oversize, the cooling effect may be increased and the number of discs must be increased. To effect changing the number of discs, the manufacturing operation must be halted, and the extrudate cut to allow one or more die members to be removed, or added, from the cascade die, depending upon the condition of the extrudate.

The foregoing procedure is simplified by another embodiment of the invention wherein each die member is a composite of a pair of overlying metallic discs, each disc of a pair having an elongated slot extending inwardly from a peripheral edge, and the discs of the composite are oriented so that the closed end of each slot defines a portion of the aperture. In this embodiment, a die member can be inserted or removed while the extrudate is moving without the need to stop the manufacturing process.

BRIEF DESCRIPTION OF THE DRAWINGS

Embodiments of the invention are shown in the accompanying drawings wherein:

FIG. 4 is a top view of a second embodiment of a cascade die according to the present invention;

FIG. 5 is an end view of the cascade die shown in FIG. 4 looking in the direction of the line 5—5 of FIG. 4;

FIG. 10 is a tranverse section taken through the tank shown in FIG. 3 but with a cascade die of the configuration shown in FIG. 4 utilizing a composite die member illustrated in FIG. 9.

DESCRIPTION OF THE PREFERRED EMBODIMENTS

Figure 1:
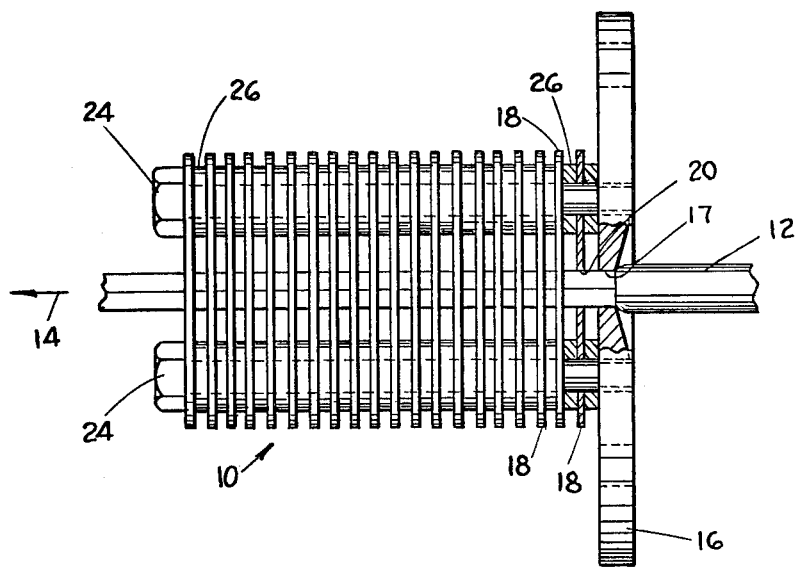
FIG. 1 is a side view, partially in section, of one embodiment of a cascade die according to the invention.
Figure 2:
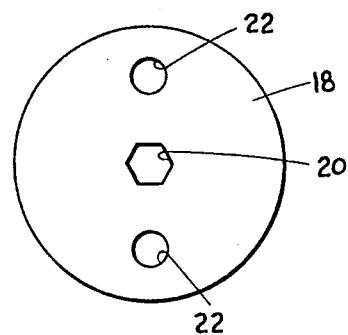
FIG. 2 is a plan view of a single die member of the cascade die shown in FIG. 1.

Referring to FIG. 1, reference numeral 10 designates a cascade die designed to cool, size, and smooth a pencil extrudate 12 which is pulled through the die in the direction of arrow 14 by a puller-cutter mechanism (not shown), which may be of the form disclosed in U.S. Pat. No. 3,877,626. Die 10 comprises a mounting plate 16 containing central orifice 17, a plurality of die members 18 each having an aperture or hole 20, and means mounting the die members on the mounting plate downstream thereof in cascade relationship (i.e., serially) so that the members are axially spaced and the holes 20 are in alignment with orifice 17 in the mounting plate. Each die member 18 is provided with a pair of peripheral mounting holes 22 (FIG. 2) through which pass respective elongated mounting bolts 24 whose free ends are threaded into suitable holes in mounting plate 16 as shown in FIG. 1. The die members may be of any suitable metal which acts as a heat sink, for example, stainless steel, brass, etc. A plurality of washers 26 are passed over the bolts and are interposed between successive die members 18 thereby causing the die members to be uniformly spaced in the axial direction. Alternatively, washers of different thicknesses may be utilized for the purpose of obtaining a non-uniform axial distrubition of the die members. As illustrated, the die members 18 are connected to the mounting plate 16 in a cantilever manner.

Figure 3:
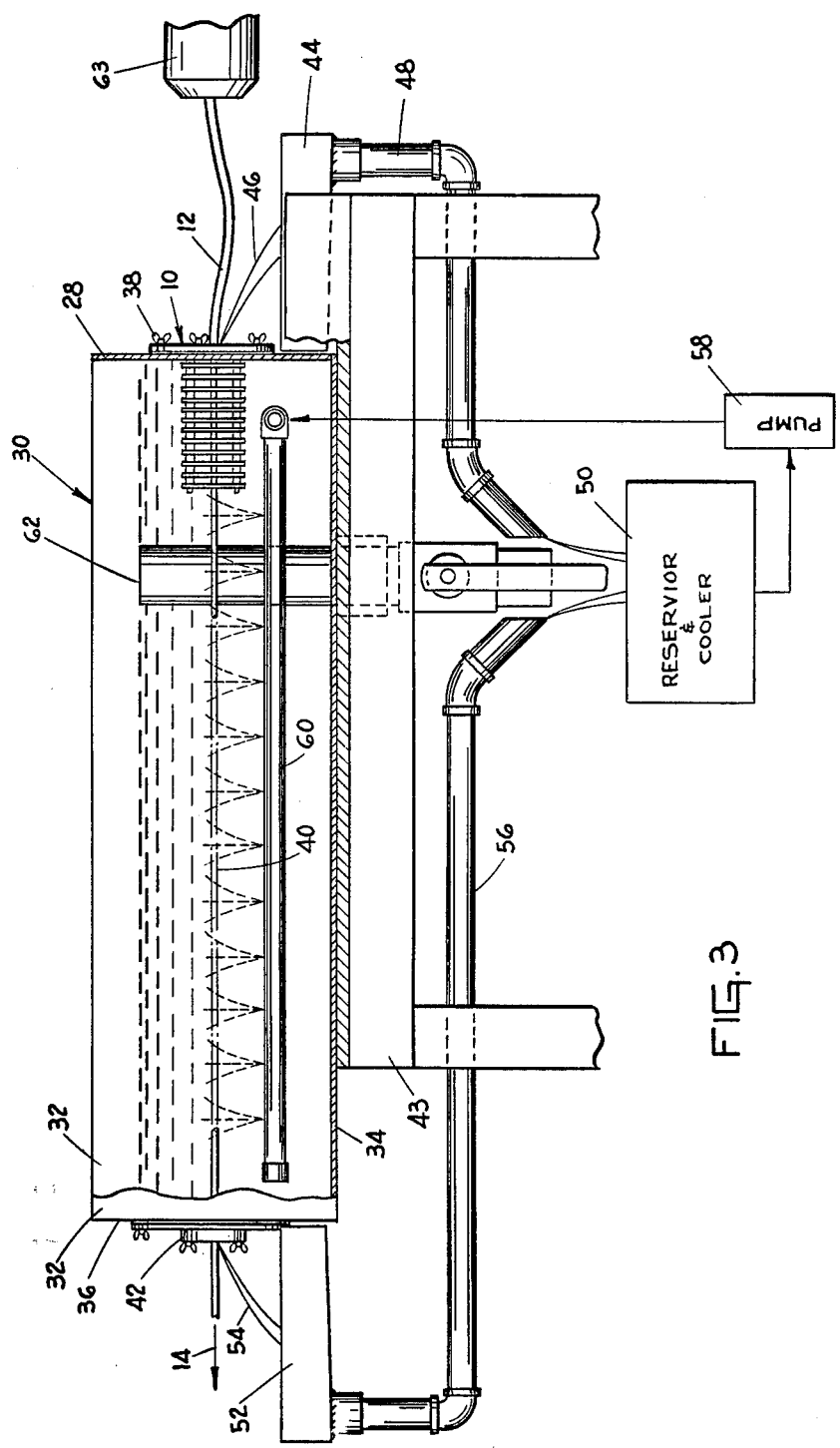
FIG. 3 is a side view, partially in section, of a tank into which the cascade die of FIG. 1 is incorporated.

Cascade die 10 is mounted on leading end wall 28 of a tank 30 as shown in FIG. 3. Tank 30 comprises, in addition to end wall 28, a pair of opposite side walls 32, a bottom wall 34, and a trailing end wall 36 connected together to form a tank with an open top. End wall 28 is provided with an aperture large enough to receive the die members 18 allowing the die 10 to be inserted through the aperture from the outside so that the die members are contained within the tank and mounting plate 16 abuts the outside of wall 28. The die is fastened to the wall 28 by means of wing nuts 38, there being a suitable gasket (not shown) surrounding the peripheral edge of the mounting plate 16 to prevent coolant leakage. Axially aligned with the aperture in wall 28 and with the sizing holes 20 in members 18 and sizing hole 17 in plate 16, is an orifice (not shown) in the end wall 36 allowing the treated or conditioned extrudate 40 to exit from the tank through retaining plate 42 having an opening slightly larger than the cross-section of the extrudate.

Tank 30 is mounted on a suitable frame 43 carrying the coolant, plumbing and other appurtenances necessary for water cooling the extrudate in the tank. A leading catch basin 44 is attached to wall 28 of the tank and to the frame 43 for receiving a stream of water 46 that issues from the tank around the extrudate passing through orifice 17 in plate 16. The water in basin 44 is conveyed by pipes 48 to a reservoir and cooler 50 carried on the frame. Similarly, a trailing catch basin 52 catches a stream of water 54 that issues around the extrudate passing through the orifice in plate 42 attached to the wall 36. Water in basin 52 is returned by piping 56 to reservoir 50. Water from reservoir 50 is conveyed by pump 58 to a pair of headers 60, only one of which is shown in FIG. 3. Headers 60 run axially along the length of the tank at a level below the level of sized extrudate 40, and are laterally spaced from the center line on each side of the sized extrudate. Each header is provided with a plurality of openings facing upwardly as seen in FIG. 3 so that chilled water is forced by pump 58 around the extrudate 40 as indicated by the broken lines in FIG. 3. To control the depth of water in the tank, an overflow tube 62 is provided, the tube extending through the bottom 34 of the tank and emptying into reservoir 50. In operation, the hot, semi-plastic pencil extrudate 12 produced by extruder head 63 is fed into the die 10, pulled therethrough and through the tank in the direction of arrow 14.

The particular material and thickness in surface area of the discs 18, their number and spacing, and the coolant and its temperature are parameters that depend on the composition of the extrudate 12 and the rate of extrusion. It will be apparent that a person skilled in the art can obtain these parameters to furnish the desired uniformity in cross-section and surface condition of the extrudate. The number of discs and their spacing as shown in the drawings are illustrative of the principles of the invention.

Each disc acts as a heat sink removing heat from the extrudate as it passes through the disc so that the amount of heat extracted from the extrudate is directly related to the number of discs that are cascaded downstream of the mounting plate. For discs of a given material, thickness and surface area, the number of discs must be decreased to reduce cooling if the downstream extrudate is running undersized. To carry out this modification of the apparatus shown in FIG. 3, the manufacturing operation must be halted, the extrudate cut, and the cascade die 10 suitably modified. This modification is carried out by removing the elongated bolts 24 from flange 16 and removing one or more discs 18. The process is resumed by threading the extrudate 12 back into the die 10 and pulling it in the direction of arrow 14 as described previously.

Figure 6:
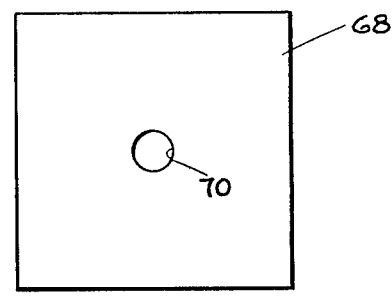
FIG. 6 is a plan view of a die member designed for the cascade die shown in FIG. 4.
Figure 7:
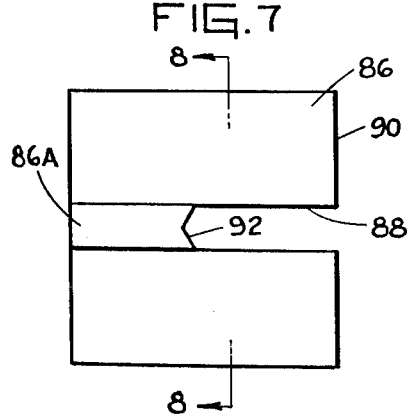
FIG. 7 is a plan view of one of a pair of discs used to provide a composite die member.
Figure 8:
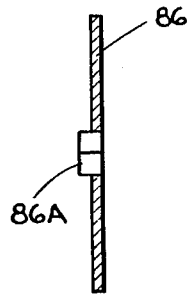
FIG. 8 is a section taken through the disc of FIG. 7 taken along the line 8—8.

In order to facilitate the removal of discs from the cascade die, the arrangement shown in FIG. 4 may be utilized. In FIG. 4, cascade die 64 comprises a mounting plate 66 having a central orifice 65, a plurality of die members 68 in the form of rectangular or square discs (FIG. 6), each having an aperture or hole 70, and means mounting the die members on the mounting plate in cascade relationship so that the die members are axially spaced apart and the sizing holes 70 are in alignment with the orifice 65 in the mounting plate. In this embodiment, the means mounting the die members on the mounting plate are in the form of a pair of elongated bars 72, each having a plurality of transverse slots 74. One end of each bar is provided with threaded holes 76 for receiving the threaded end of cap screws 78 by which the bars are connected to the mounting plate such that the slots 74 in one bar are aligned with the slots 74 in the other bar. The slots 74 are wide enough to slidably receive the discs 68 allowing the discs to be inserted or removed at will. The discs are held in the bars in the manner shown in FIG. 5 wherein retaining strips 80 fastened by screws 81 to a bottom longitudinal edge 82 of each of the bars overlie the slots and form a stop for the discs. In this manner, the sizing holes 70 in the discs are held in alignment with the orifice 65 in plate 66, and discs may be added or removed without the inconvenience of disassembly of the die.

Die 64 is utilized in the same manner as die 10 shown in FIG. 3 in that mounting plate 66 is attached to an end wall 28' as shown in FIG. 4 of a cooling tank so that the bars 72 of the die extend inside the tank and overlie the bottom 34' of the tank. The die is attached to the end wall 28' by means of a plurality of thumb screws 38 which are threaded into the end wall. A gasket indicated at 83 serves to seal the contents of the tank against leakage around the periphery of plate 66. In this arrangement, the retaining strips 80 face the bottom wall 34' as indicated in FIG. 4. Thus, the discs 68 can be inserted and removed from the open top of the tank.

Another feature of the embodiment of the die shown in FIG. 4 is the non-uniformity in spacing between the die members. Specifically, the drawing shows the die members to be arranged in a plurality of groups, the die members being equally spaced within each group. The spacing of each group may vary geometrically as indicated in FIG. 4, that is to say, the spacing in one group may be related to the spacing in an adjacent group by a factor of two. The construction of cascade die 64, whereby the individual discs can be removed or added from the top of the tank without requiring the die to be disassembled from the tank, is advantageous over the construction of cascade die 10. While die 64 is shown with non-uniform spacing between the die members, it is apparent that the slots 74 could be equally spaced to achieve the same result as achieved with die 10.

Figure 9:
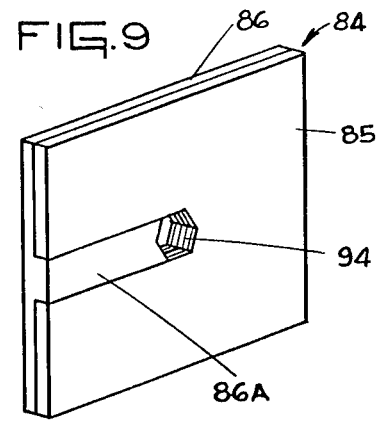
FIG. 9 is a perspective view of a pair of discs of the type shown in FIG. 7 assembled together into a composite die member.

While the die shown in FIG. 4 facilitates adding or removing die members as compared to the cascade die shown in FIG. 1, the use of die 64 also necessitates shutting down the manufacturing operation when it is desired to change the number of spacing of die members. The problem of adding or removing a die from the cascade die is eliminated when a composite die member indicated by the reference numeral 84 in FIG. 9 is utilized. Member 84 comprises a pair of identical discs 86 each of which has an elongated slot 88 extending inwardly from a peripheral edge 90, the slot 88 extending inwardly from a peripheral edge 90, the slot 88 terminating in a closed end 92. Disc 86 is provided with a rib 86A extending from the closed end 92 of the slot toward the edge of the disc opposite edge 90 into which the slot opens. The rib of one disc of the pair is slidably received within the slot 88 of the other disc of the pair as indicated in FIG. 9. Thus, the closed end of each slot defines a part of the hole 94 shown in FIG. 9.

Composite die members 84 are used in the manner shown in FIG. 10 wherein bars 72A (corresponding to bars 72 in FIGS. 4 and 5) are attached to a mounting plate 66A (corresponding to plate 66 in FIGS. 4 and 5). Plate 66A, however, is angularly positioned on the front end wall 28A of tank 30A such that bars 72A are oriented horizontally rather than vertically as shown in FIG. 4. The width of the transverse slots in bars 72A is made compatible with the thickness of die members 84 which are oriented in the slots in bars 72A such that slots 88 in the die members are horizontally disposed allowing the die members to be inserted into the slots in bars 72A by a horizontally sliding movement. Retaining strips 80 may be fastened to a single bar 72A as shown in FIG. 10 to retain die members 84 such that holes 94 are collinear with each other and with the entrance hole in plate 66A.

The number or spacing of die members can be changed without interrupting the extrusion operation. First, the retaining strips 80 are removed to gain access to the slots in bars 72A. If another die member is to be inserted into bars 72A, the die member is separated into its component discs 85 and 86 and each disc is positioned between respective side walls 32 of the tank and bars 72A as shown in phantom lines in FIG. 10. The two discs can then be moved toward each other as the extrudate is captured in slots 88 of the discs. In their final position, the discs define hole 94 and the die member is made operational. The retaining strips are then reattached to one of the bars 22A to complete the modification of the cascade die. If the die member is to be removed from bars 72A, strips 80 are detached and discs 85 and 86 of the die are separated by moving them apart in a manner opposite to that described above. In either case, the split nature of die member 84 allows it to be added or removed from the cascade die without severing the extrudate and without interrupting the extrusion process.

It is believed that the advantages and improved results furnished by the die of the invention will be apparent from the foregoing description of several preferred embodiments of the invention. Various changes and modifications may be made without departing from the spirit and scope of the invention as sought to be defined in the following claims.

I claim:

1. A die for conditioning an extrudate comprising:
  (a) a mounting plate having an orifice for receiving an extrudate;
  (b) a plurality of die members each having an aperture, the die members being composites of a pair of metallic discs; and
  (c) means mounting the die members on the mounting plate in cascade relationship so that the members are axially spaced and the apertures are in alignment with the orifice in the mounting plate.

2. A die according to claim 1 wherein each disc of a pair has an elongated slot with a closed end extending inwardly from one edge of a disc, the discs of a pair being held in the support members such that the closed end of each slot defines a part of the sizing hole.

3. A die according to claim 2 wherein each disc of a pair has a rib extending from the closed end of the slot toward the end of the disc opposite the end into which the slot opens, the rib of each disc being thicker than the remainder of the disc, the rib of one disc of a pair being slidably received in the slot of the other disc of the pair.

4. A die according to claim 3 wherein the die members are non-uniformly spaced.

5. A die according to claim 4 wherein the support members are a pair of elongated bars having transverse slots, one end of each bar being connected to the mounting plate so that the slots in one bar are aligned with the slots in the other bar, the composites being slidably mounted in respective ones of the aligned slots.

6. A die according to claim 5 including retaining strips removably attached to one bar on opposite transverse edges to overlie the transverse slots and retain the composites therein.

7. A die according to claim 6 in combination with the cooling tank having an end wall to which the mounting plate is attached, and a pair of spaced side walls connected to the end wall, the bars of the die extending inside the tank between the side walls.

8. The combination according to claim 7 wherein the die is oriented so that the retaining strips face the sides of the tank.

9. A die for conditioning an extrudate comprising:
  (a) a mounting plate having an orifice for receiving an extrudate;
  (b) a plurality of metal disc die members each having an aperture; and
  (c) a pair of spaced elongated support members mounting the die members on the mounting plate in a cantilever manner and in cascade relationship so that the members are axially spaced and the apertures are in alignment with the orifice in the mounting plate, the support members being in the form of a pair of elongated bars having transverse slots, one end of each bar being connected to the mounting plate such that the slots in one bar are aligned with the slots in the other bar, the die members being in the form of flat discs and being slidably mounted in respective aligned slots.

10. A die according to claim 2 including retaining strips removably attached to corresponding edges of the bars to overlie the transverse slots in the bars and retain the discs therein.

11. A die according to claim 10 in combination with a cooling tank having an end wall to which the mounting plate of the die is attached so that the elongated bars of the die extend inside the tank and overlie the bottom of the tank.

12. The combination of claim 7 wherein the die is oriented so that the retaining strips face the bottom of the tank.

13. A die for conditioning an extrudate comprising:
  (a) a mounting plate having an orifice for receiving an extrudate;
  (b) a plurality of metal disc die members each having an aperture; and
  (c) a pair of spaced elongated support members mounting the die members on the mounting plate in a cantilever manner to form an assembly having one end adjacent the mounting plate and an opposite end free for access to the die members, the die members being in cascade relationship so that the members are axially spaced and the apertures are in alignment with the orifice in the mounting plate.

14. A die according to claim 1 wherein the die members are unitary flat discs of metal.

15. A die according to claim 1 wherein the die members are spaced by intermediate washers that pass over the support members.

* * * * *